United States Patent [19]
Ganci

[11] 3,853,755

[45] Dec. 10, 1974

[54] OSMOSIS EFFICIENCY FROM TANNIN TREATMENT OF NON-POROUS SEMIPERMEABLE MEMBRANES HAVING HYDROUS HEAVY METAL COATINGS

[75] Inventor: James Barry Ganci, Wilmington, Del.

[73] Assignee: E. I. du Pont de Nemours and Company, Wilmington, Del.

[22] Filed: Nov. 6, 1972

[21] Appl. No.: 303,779

[52] U.S. Cl................... 210/23, 210/433, 210/490, 210/500
[51] Int. Cl............................................. B01d 13/00
[58] Field of Search......... 210/22, 23, 37, 321, 490, 210/500; 260/32.4, 32.6 R

[56] References Cited
UNITED STATES PATENTS

| | | | |
|---|---|---|---|
| 3,344,928 | 10/1967 | Kraus et al. | 210/500 |
| 3,497,394 | 2/1970 | Berger | 210/22 X |
| 3,660,281 | 5/1970 | Tober | 210/23 |
| 3,700,591 | 10/1972 | Higbey | 210/23 |

*Primary Examiner*—Frank A. Spear, Jr.
*Assistant Examiner*—Ferris H. Lander

[57] ABSTRACT

The passage of salts through a non-porous semipermeable membrane with a coating layer of a hydrous heavy metal composition under reverse osmosis conditions is reduced after the membrane and the coating layer have been contacted with a solution of a hydrolyzable tannin.

9 Claims, No Drawings

OSMOSIS EFFICIENCY FROM TANNIN TREATMENT OF NON-POROUS SEMIPERMEABLE MEMBRANES HAVING HYDROUS HEAVY METAL COATINGS

BACKGROUND OF THE INVENTION

1. Field of the Invention

This invention relates to improved semipermeable structures for separating the components of aqueous compositions by reverse osmosis. More particularly, this invention is directed to a process for separating solvent from an aqueous solution of salts by contacting the solution under reverse osmosis conditions with a permselective structure comprising a non-porous semipermeable membrane and a hydrous heavy metal composition coating layer after such structure has been treated with a solution of a hydrolyzable tannin.

2. Description of the Prior Art

Permselective separation processes such as dialysis, ultrafiltration and reverse osmosis have long been of interest for the separation of impurities from aqueous mixtures and the desalination of brackish and sea waters. The recent development of improved membranes in film, coating and hollow fiber form and of improved apparatus employing these membranes have made such processes more practical and more economically attractive.

It is well known that complete separation of the more permeable from the less permeable components of liquid mixtures is not practical with even the recently improved permselective membranes. All components of a mixture permeate to some degree through any permselective membrane which has a commercially practical permeation flux rate for the more permeable components. A principal goal in the art has been the production of improved membranes and other permselective structures with more economically attractive optimum balances of high flux rates for more permeable components and high rejection efficiencies for less permeable components of liquid mixtures than can be obtained by the art-recognized methods for preparing and treating such membranes.

The fouling of permselective membranes during use is a well known problem. Elaborate feed solution preparation systems are frequently used to reduce the build-up of fouling layers from the pressurized surfaces of non-porous semipermeable membranes, particularly of those membranes used in the desalination of brackish and saline waters which contain suspended clays and dissolved or dispersed salts and hydrous compositions of heavy metals. Fouling layers of such materials can significantly reduce water flux through reverse osmosis membranes. They also, in general, increase salt passage through such membranes possibly because of increased concentration polarization. Fouling layers on permselective membranes therefore reduce the commercial attractiveness of reverse osmosis and other permselective processes.

Several techniques are known for reducing the rate of salt passage through reverse osmosis membranes without corresponding reduction of water flux so as to obtain more attractive balances of water flux than salt passage. These include exposing suitable membranes to hot water as described, for example, in U.S. Pat. No. 3,446,359 and exposing other suitable membranes to mixtures of solutions containing materials which change the permselective properties of the membranes. Thus, U.S. Pat. No. 3,310,448 describes the reduction in the salt passage of cellulosic membranes upon addition of a water-soluble cationic surfactant to the feed solution; U.S. Pat. No. 3,373,056 describes processes in which cellulose acetate membranes are exposed to aqueous solutions containing, for example, guartec gum or copper ferrocyanide to obtain a reduction in salt passage through the membrane; and Ganci et al. in U.S. application Ser. No. 214,404, filed Dec. 30, 1971, describe processes in which the solute rejection properties of certain nitrogen-linked aromatic polymer membranes are improved by exposing the membrane to solutions of certain ethers. However useful such techniques are in treating membranes to improve their balance of water flux and salt passage properties, they do not overcome or counteract the increased salt passage observed with fouled membranes under reverse osmosis conditions.

Kraus et al. disclose in Desalination, Vol. 2, pages 243–266 (1967) and in U.S. Pat. No. 3,449,245 that permselective structures can be prepared by contacting a porous substrate with an aqueous phase containing a dispersible material including inorganic ion exchangers such as clays and water soluble salts of polyvalent metals capable of forming hydrous metal oxides, for example, ferric, thorium, copper, and lead salts under conditions which force a portion of the aqueous solution through the porous substrate and form thereon a finely poured semipermeable membrane. Kraus et al. also disclose in U.S. Pat. No. 3,344,928 that a permselective structure having improved separation properties is formed when an extract of decaying oak leaves is the aqueous phase and the substrate is a porous structure having thereon a coating layer of bentonite clay. In such permselective structure the coating layer is the permselective membrane and is not a foulant layer. Thus, there is in the art no disclosure of a means for treating a foulant layer which has reduced the separation efficiency of a non-porous semipermeable membrane so as to increase the separation efficiency of the fouled membrane structure and make it comparable to or exceeding that of the membrane prior to fouling.

It is an object of this invention to provide a process for the reverse osmosis desalination of aqueous solutions which employs permselective structures with reduced salt passage and improved balance of salt passage and water flux. It is an additional object of this invention to provide such a process employing permselective structures comprising a non-porous semipermeable membrane and a foulant layer of hydrous heavy metal compositions. These and other objects are accomplished by this invention as described herein below.

SUMMARY OF THE INVENTION

In summary this invention is directed to a process for separating solvent from an aqueous solution or inorganic salts comprising contacting a permselective structure with the solution under a pressure greater than the osmotic pressure of the solution, said permselective structure comprising a non-porous semipermeable membrane and a coating of hydrous heavy metal compositions and said structure having been treated with a solution of a hydrolyzable tannin in an amount and under conditions which result in a significant reduction in salt passage through the structure under reverse osmosis conditions.

By the process of this invention non-porous semipermeable membranes which have been fouled by a layer of hydrous heavy metal compositions is restored to efficiency equal to or superior to that originally exhibited.

DESCRIPTION OF THE INVENTION

1. Membranes

The permselective structures useful in the reverse osmosis desalination processes of this invention comprise non-porous semipermeable membranes, coating layers of hydrous heavy metal compositions and associated therewith, hydrolyzable tannins. The membranes can be of any of the several compositions and types known in the art and can be used in the form of flat films, coatings on porous substrates in sheet or tubular form or as thin-walled, hollow capillaries or fibers, etc. Preferably these membranes are made of synthetic organic polymers and have asymmetric structures such as the membranes described in U.S. Pat. Nos. 3,133,132 and 3,567,632 and German OLS 2021383 and by Kimura in Industrial and Engineering Chemistry, Product Research and Development, Vol. 10, pages 335–339 (1971). Synthetic organic polymers are man-made in the usual connotation and are generally composed substantially of carbon, hydrogen, oxygen, nitrogen and sulfur but can also contain other such elements as phosphorus and silicon. Asymmetric, polymeric membranes have on one surface a relatively thin skin of dense polymer and on the other surface a relatively more porous, more thick and less dense supporting structure and have permselective properties dependent on the direction of passage of the permeant through the structure. Especially preferred non-porous, semipermeable, polymeric, asymmetric membranes useful in the permselective structures described herein are the cellulosic derivative membranes of Loeb, U.S. Pat. No. 3,133,132 and nitrogen-linked aromatic polymer membranes of Richter et al., U.S. Pat. No. 3,567,632. The cellulosic derivatives have the general structural formula of

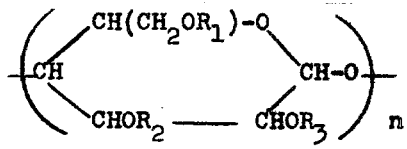

wherein $R_1$, $R_2$ and $R_3$ are hydrogen, alkyl of one to eight carbon atoms or $CR_4O$ wherein $R_4$ is alkyl of one to seven carbon atoms, and $n$ is an integer sufficiently large to provide film forming molecular weight.

The polymers of Richter et al. have the general structural formula of $+L-R+_n$.

wherein each L is independently a linking group and is a

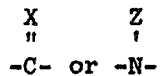

group wherein X is oxygen or sulfur and Z is hydrogen, lower alkyl or phenyl, each R is an organic radical, and $n$ is an integer sufficiently large to provide film forming molecular weight.

The membranes used in the processes of this invention are non-porous. The flow of fluids through non-porous membranes is substantially in accordance with Fick's laws, whereby the rate of passage of any component of a fluid through a membrane is related to the solubility and diffusivity of the component in the membrane material and this rate increases with applied pressure due to the resulting increase in the chemical potential of the component across the membrane. In contrast, porous membranes exhibit flow properties related to the sizes of pores extending through the membrane thickness as indicated by the equations of Poiseuille and Knudsen and various modifications thereof as discussed in Perry's Chemical Engineers ' Handbook, Fourth Edition, Chapter 17, pages 33ff (1963) and elsewhere. The relative porosity and non-porosity of membranes can be determined by measuring the relative flow rates of the components of mixtures through the membranes at different pressures. Such studies are complicated and the results are dependent on the particular flow model presumed in the mathematical analysis of the primary data.

For semipermeable membranes useful in reverse osmosis separation processes of this invention, the degree of porosity of a membrane can be determined by the salt passage through the membrane under specified reverse osmosis conditions. The term "non-porous" is applied herein to such membranes which have salt passages of preferably less than about 10 percent with an applied pressure of 600 pounds per square inch gage on an aqueous solution containing 0.5 weight percent sodium chloride under conditions such that between about 5% and about 50% of the feed solution passes through the membrane. In contrast, semiporous membranes, wherein solute passage is primarily through relatively small pores, have salt passages ranging generally between about 25 percent and 50 percent under these conditions. Typical membranes of this porosity are those described by McLain et al. in U.S. Pat. No. 3,423,491 and by Cescon et al. in U.S. Pat. No. 3,551,331. Similarly, porous membranes have salt passages ranging generally between about 80 percent and 100 percent under these conditions. Typical permselective membranes and structures of this porosity include those described by Kraus et al. in *Desalination*, Vol. 2, pages 243 to 260 (1967) and in U.S. Pat. Nos. 3,344,928 and 3,449,245. Membranes with combinations of porous, semiporous, and non-porous flow properties typically have intermediate salt passages under these reverse osmosis conditions.

As used herein, the term "semipermeable" has the usual denotation of the ability to preferentially permeate one or more components of a fluid mixture while simultaneously restraining permeation of one or more other components. For the purposes of the present invention, a membrane is considered semipermeable when it exhibits a solute passage of less than 20 percent under permselective separation conditions such that a useful amount of a solvent component of the fluid mixture passes through the membrane. For the processes of this invention which involve aqueous solution separations under reverse osmosis conditions, a useful solvent flux is considered to be a solvent passage through the membrane of at least 0.15 gallon per square foot per day with an applied pressure of 600 pounds per square inch gage on an aqueous solution containing 0.5 weight percent sodium chloride under conditions such that between 5% and 50% of the feed solution passes through the membrane. The preferred semipermeable membranes suitable for use in this invention exhibit a solute passage of less than 10 percent under these conditions.

2. The Fouling Layer

The coating layers of hydrous metal compositions of the permselective structures of this invention can comprise compositions containing heavy metals as defined in the periodic table of Lange's "Handbook of Chemistry" 10th Edition, 1961, pages 56–57. Thus the class of "suitable" metals includes iron, chromium, nickel, copper, thorium and lead. Suitable metal compositions include the water-soluble salts of such polyvalent metals capable of forming hydrous metal oxides. They also include any hydrous compositions which are sufficiently insoluble in aqueous systems to deposit on and remain as coatings on the non-porous membranes under reverse osmosis conditions.

3. Fouling

Coatings of hydrous metal compositions can be formed on the surfaces of non-porous semipermeable membranes in several ways. A frequently occurring pattern involves introduction of a suitable metal compound into an aqueous solution which is contacted with a rejecting surface of a membrane under reverse osmosis conditions. The metal compound can be a soluble hydrolyzable salt capable of forming an insoluble hydrous metal composition; for example, a small amount of a soluble salt of iron, chromium, cobalt, nickel, or copper can be present in such an aqueous feed solution. Coating of the membrane is highest when the pH of the feed solution is that at which the metal salt will be partially hydrolyzed but not precipitated in the solution itself. Alternately, the pH of the feed solution can be within one pH unit of the iso-electric pH of the metal composition, that pH at which the composition is least soluble and least ionized. Such soluble metal compositions can be introduced into the feed solution through corrosion or other types of attack on any metal components of the reverse osmosis system.

Coatings of hydrous metal compositions can be formed on the surfaces of non-porous semipermeable membranes also when a rejecting surface of a membrane is contacted with a soluble solution of a salt of a suitable metal while the other surface of the membrane is in contact with a solution containing a soluble base, e.g. sodium hydroxide, and a salt, e.g. sodium chloride, at a concentration sufficient to provide an osmotic pressure greater than about 25 pounds per square inch and therefore sufficient to promote passage of water from the alkaline solution into the solution of a salt of a suitable metal.

The presence of layers of hydrous metal compositions on the surfaces of polymeric membranes can be detected and the approximate amount of a given metal in such layers can be determined by a recently developed analytical technique called ESCA (Electron Spectroscopy for Chemical Analysis) described by Siegbahn et al. in Nature, Vol. 210, pages 4–6 (1966) and in the book "ESCA Atomic, Molecular, and Solid State Structure Studies by Means of Electron Spectroscopy" (1967).

The presence of layers of hydrous metal compositions on the surfaces of the membranes can also be detected and the amount of a given metal in such coatings can be determined by dissolving from the membranes any coating layers which are present and analyzing for the metals of interest by conventional techniques. Such coating layers can frequently be dissolved by mineral and organic acids which form relatively stable and soluble compounds or complexes with heavy metals. Preferred complexing and sequestering agents for removing such layers from membranes include ethylenediaminetetraacetic acid and related materials and also the organic acids and their ammonium, alkali, and alkaline earth metal salts which are commonly used to dissolve colloidal hydrous heavy metal compounds in aqueous systems, e.g. oxalic, citric, maleic, fumaric, and ascorbic acids. Those coating compositions which cannot be dissolved with such agents, e.g. clays and clay-like materials, can frequently be identified by microscopic and x-ray analysis of the coating layers and their components.

The structures and amounts of fouling layers on non-porous membranes in the structures described herein can vary widely. In general, these layers are gelatinous and disperse while wet with water when they contain substantial amounts of hydrous oxides and hydroxides of heavy metals and are more granular when they contain clays or clay-like structures as their primary constituents. They are generally very thin and loosely adherent and can be removed easily by chemical and physical means. Fouling layers which are excessively thick can reduce water flux and increase salt passage under reverse osmosis conditions because of their promotion of concentration polarization.

Practically speaking, the amount of metal present in the foulant coating can be most easily expressed in terms of the magnitude of the coating's effect on permeation properties. Such effect can be determined by treatment of a fouled membrane with a complexing or sequestering agent (as described above for detecting a foulant coating) to remove the coating and thus restore the membrane properties, particularly salt passage, to substantially what they were in the original unfouled state.

In general, an increase in salt passage of 10% or more under conditions such as those used to determine the degree of porosity of the membrane, is considered indicative of the presence of a foulant coating.

4. Tannins

The hydrolyzable tannins suitable for use in treating the permselective structures of this invention are conveniently obtained by extracting leaves, twigs, bark, fruit and galls of trees and plants. By the term "hydrolyzable" is meant that they can be hydrolyzed with hydrolytic agents such as acids, alkali, hot water or enzymes to obtain gallic acid (such tannins are gallotannins) or ellagic acid (such tannins are ellagitannins). Such tannins are common, well known compositions and are discussed extensively in "Chemistry of Vegetable Tannins" by Haslam, Academic Press, London, 1966, pp. 91–125. Particular hydrolyzable tannins are usually identified from the source (tree or plant) of extraction, as, for example, chinese gall (tannic acid), mimosa tannins, quebracho tannins, wattle tannins, chestnut tannins, eucalyptus tannins, tea extract tannins, and the like.

In general, such tannins can be structurally characterized as hydrolyzable mixtures of complex polyphenolic substances having molecular weights in the range of 900–3000. They can be obtained by leeching leaves, galls, fruits, bark, and the like, with acetone and/or water, followed by extraction of the resulting solution with ethyl acetate, and evaporation of the ethyl acetate.

The preferred tannin for use in this invention is tannic acid. This tannin is obtained from the extraction of oak and sumac nut talls and is an amorphous powder occurring as glistening scales or spongy masses varying in color from yellow-white to light brown. Its properties are described in the Condensed Chemical Dictionary, Reinhold Publishing Corp., 7th Edition.

5. Membrane Treatment

The separation processes of this invention employ coated membranes as defined above, which have been treated with solutions of hydrolyzable tannins under conditions which result in a significant reduction in solute passage through the membrane. With respect to this invention, a significant reduction in solute passage is a reduction of 10 percent in the percent passage of a solute through the membrane under permselective separation conditions. Such conditions can be reverse osmosis conditions, for instance with an applied pressure of 600 pounds per square inch gage on an aqueous solution containing 0.5 weight percent sodium chloride and with between about 5% and 50% of the feed solution passing through the membrane. Thus, if the untreated membrane has a solute passage of 20 percent under permselective conditions, a reduction in solute passage of 2 percent or more is considered significant. Similarly, if an untreated reverse osmosis membrane has a salt passage of 2 percent, a reduction in salt passage of 0.2 percent or more to obtain a salt passage of 1.8 percent or less is considered significant.

The membrane treatment conditions required for a significant reduction in solute passage depend upon such factors as the composition of the foulant coating, the structure and composition of the membrane, the concentration of hydrolyzable tannin in the treating solution, the relative amounts of treating solution and membrane, the time and temperature of treatment on the acidity (pH) of the treating solution and the pressure of the treating solution on the membrane. In general, the reduction in solute passage will be greater as the temperature of treatment increases; the pressure of treatment increases; the lower the pH of treating solution; the higher the concentration of hydrolyzable tannin in the treating solution; and the treating time is increased. Thus, one skilled in the art can determine, easily and without undue experimentation, contacting conditions which result in a significant reduction in solute passage with any particular membrane by simple measurement before and after a series of treatments made in accordance with the general principles discussed hereinbelow.

Experience has shown that very small amounts of hydrolyzable tannins are required in treating solutions in practicing this invention. Solutions containing as little as 0.0002 weight percent (2 parts per million) of tannin can be used, and concentrations up to 2 weight percent and higher can also be used. A solution containing 0.01 weight percent (100 parts per million) to 1 weight percent is preferred in a dipping process and a solution containing 0.0005 (5 parts per million) to 0.05 weight percent is preferred in a process involving exposure of the membrane to the contacting solution under reverse osmosis conditions. Generally speaking, a concentration of at least about 5 p.p.m. is preferred and 50 p.p.m. is more preferred. The concentration of tannin required in the contacting solution will, of course, depend upon such factors as the physical structure and chemical composition of the membrane, the relative amounts of membrane and contacting solution used, and the degree of change in salt passage desired from the treatment. One skilled in the art can determine easily and without undue experimentation a contacting solution concentration which is appropriate.

The amounts of hydrolyzable tannin solutions used in the membrane treating processes described herein can be very small. In general, the amount of solution required to fill any vessel containing a membrane will provide sufficient tannins for a significant reduction in solute passage, particularly when the concentration of tannins in the solution is relatively large. An amount of solution and concentration of solution which provides as much as 25 micrograms of tannins per square centimeter of treated membrane surface will usually be sufficient.

A coated membrane as defined herein can be contacted with a solution of a hydrolyzable tannin in at least two general ways: (1) by dipping and/or soaking the membrane in the treating solution before assembly of the membrane into a permselective separation device, or (2) by passing the treating solution over the surface of the membrane after the membrane has been assembled in a separation device. Obviously, a membrane which has been treated before assembly of a separation device can also be treated in the device either before or after the membrane is used for a permselective separation.

Hydrolyzable tannins are preferably dissolved in water for treating semipermeable membranes as described herein, but can be in solution in aqueous mixtures containing methanol, ethanol, propanol, and/or butanol. The solutions of such tannins are preferably weakly acidic, with pH below 7, and preferably between 5 and 7, since most hydrolyzable tannins are subject to oxidation and hydrolysis in alkaline solutions. For instance, solutions having the acidity autogenously produced by the tannin in the absence of other acidifying or basifying materials will be between about 4 and about 6 in pH.

While very dilute solutions of hydrolyzable tannins have been found effective in treating the permselective structures of this invention, it has been observed that such tannins must be in chemically uncombined form when contacted with the permselective structures. Thus in practice the tannin solutions must contain sufficient tannins to both (a) combine with tannin reactive materials as well as (b) treat the permselective structure.

The coated membranes can be treated with tannin solutions at any temperature between the freezing and boiling temperatures of water but are conveniently treated at temperatures between about 10°C. and about 90°C. Processes involving exposure of the coated membranes to treating solutions under osmotic or applied pressures in assembled devices are more conveniently operated near or slightly above ambient temperatures, for example between about 20°C. and about 40°C. The reduction in solute passage is sometimes more significant in membranes which have been soaked in treating solutions at elevated temperatures, for example between about 40°C. and about 90°C. Significant reductions in solute passage can be obtained upon contacting the coated membranes with tannin solutions for times as small as one second or less (as in passing the membrane as film or filament continuously through a relatively concentrated treating solution) and times as long as several days (as in adding a suitable tannin to the feed of a reverse osmosis device operating under pressure with a relatively low throughput). Treating times will usually be between about 30 seconds and about 24 hours and preferably will be between about 2 minutes and about 5 hours. The benefits of these treating processes are obtained quickly and little or no additional benefit is derived from treating times beyond a few hours.

The amount of a hydrolyzable tannin which must be associated with a hydrous metal composition coating layer on a semipermeable membrane for a significant reduction in salt passage cannot be predicted. The mechanism by which these tannins influence the solute passage properties of the combined coating layer and membrane structures described herein is not completely understood. Available evidence indicates that the hydrolyzable tannins change the properties of the structures so as to change the relative rates of passage of salts and water therethrough without significantly affecting the other properties of the structures. The amount of a tannin which must be associated with any particular structure for a significant effect on salt passage properties can easily be determined by one skilled in the art without undue experimentation.

The amounts of hydrolyzable tannins present in the coating layers of the permselective structures of this invention can be very small. In general, such coating layers will contain at least about 5 micrograms per square centimeter, preferably they contain at least about 10 micrograms per square centimeter, and most preferably at least about 20 micrograms of hydrolyzable tannins per square centimeter of coating.

With respect to this invention, a significant reduction in the salt passage of a combined coating layer and semipermeable membrane is considered to be a reduction of 10 percent of the salt passage of the untreated combination. Thus, if the untreated combination has a salt passage of 20 percent under permselective conditions, a reduction in salt passage of 2 percent or more upon contacting with a solution of a hydrolyzable tannin is considered significant. Similarly, if the untreated combination has a salt passage of 2 percent, a reduction in salt passage of 0.2 percent or more to obtain a salt passage of 1.8 percent or less is considered significant. Preferably the reduction in salt passage is 50% or more.

The amount of tannin present in coating layers can be determined by traditional analytical techniques after dissolving the coating layer. For example, the amount of dissolved tannin can be determined colorimetrically after adding an appropriate amount of Folin-Ciscalteau Phenol Reagent solution to a suitably buffered solution. The results of such analyses will indicate less than the actual amount of hydrolyzable tanning present in the coating layer whenever the membrane composition and the procedure for dissolving the coating layer results in transfer of tannins from the coating layer to the membrane. The amounts of hydrolyzable tannins removed from solutions contacted with coated membranes can be determined by similar analyses of the contacting solutions.

The permselective structures of this invention can be structures containing a non-porous semipermeable membrane coated with two or more layers of hydrous metal compositions containing hydrolyzable tannins. These plural layers can be separated from adjacent layers and from the membrane by other layers of materials, such as other fouling materials of various kinds. For example, the fouling of a structure of this invention with suspended matter in the feed water under reverse osmosis conditions will, in general, reduce the water flux and/or increase the salt passage through the structure. It is sometimes practical to restore the structure to a more desirable balance of water flux and salt passage by forming a layer of a hydrous metal composition on the surface of the fouled structure and subsequently introducing a hydrolyzable tannin into the feed water in order to form a second coating layer of a hydrous metal composition containing an effective amount of a hydrolyzable tannin. When the fouling material is a hydrous metal composition, the same desirable result is achieved by introducing a hydrolyzable tannin into the feed water.

6. Use

The coated membrane structures containing hydrolyzable tannins described herein can be used for aqueous selective permeation separation processes such as reverse osmosis and ultrafiltration. In an aqueous reverse osmosis process water is forced from an aqueous solution through a membrane by a pressure greater than the osmotic pressure of the solution to obtain products containing reduced and increased proportions, respectively, of at least one component of the solution. The subject membranes are particularly useful for the reverse osmosis desalination of saline and brackish waters. In an aqueous ultrafiltration process water is forced by pressure from an aqueous mixture through a membrane to obtain products containing reduced and increased proportions of a dissolved or dispersed component which has a molecular or particle size such that the mixture has a relatively low osmotic pressure. Typical ultrafiltration processes include the isolation of virus and bacteria, fractionation of blood fluids and the concentration of alkaloids, glucosides, serums, hormones, vitamins, vaccines, aminoacids, antibiotics, fruit and vegetable juices, sugar solutions, milk liquids, extracts of coffee and other vegetable materials, and many other such systems.

The invention described herein is illustrated by the following examples, in which all parts and percentages are by weight unless otherwise indicated.

EXAMPLE 1

Samples of hollow fiber membranes were taken from a commercial hollow fiber permeator that had been run on a surface water feed containing about 500 p.p.m. dissolved salts, including heavy metal salts and some colloidal matter, until the permeation characteristics of the hollow fiber membrane had substantially deteriorated.

A sample of silt that had accumulated in the permeator during the use period was analyzed by emission spectrography, yielding the following elemental analysis:

| | | | |
|---|---|---|---|
| Al | 1–5% | Cu | 100–500 p.p.m. |
| Si | 0.5–2% | Sn | 50–250 p.p.m. |
| Cr | 0.5–2% | Ti | 50–250 p.p.m. |
| P | 0.2–1% | Mo | 50–250 p.p.m. |
| Zn | 0.1–0.5% | Mn | 20–100 p.p.m. |
| Mg | 200–1000 p.p.m. | Fe | <50 p.p.m. |
| Pb | 200–1000 p.p.m. | Sb | <50 p.p.m. |
| Na | <500 p.p.m. | Ni | <50 p.p.m. |
| Ca | <500 p.p.m. | B | 10–50 p.p.m. |
| Sr | <500 p.p.m. | Ag | <5 |

The hollow fiber membranes of this permeator had been prepared as follows.

Substantially as described by Magat in Example 10 of U.S. Pat. No. 3,184,436, a mixture of 70 parts of isophthaloyl chloride and 30 parts of terephthaloyl chloride was added gradually to a dimethylacetamide solution of a substantially stoichiometric amount of a mixture of 80 parts of metaphenylene diamine and 20 parts of the calcium salt of metaphenylene diamine-4-sulfonic acid. The resulting polymer nominally contained 1.5 percent sulfur, equivalent to 0.46 sulfonic acid moieties per 1000 grams. A solution of the lithium salt of this polymer in dimethylacetamide containing 20 parts of lithium nitrate and 6 parts of lithium chloride (based on the polymer present) was spun through a 150 hole spinneret to obtain hollow fibers substantially as described in Example 2 of Richter et al. U.S. Pat. No. 3,567,632. These hollow fibers were extracted with water to obtain asymmetric hollow fiber membranes with an outside diameter of 87 microns and an inside diameter of 40 microns. These membranes were kept wet with water until used.

The above "fouled" hollow fiber samples were rinsed with deionized water, and stored in deionized water until assembled into test reverse osmosis separation units. In assembling such units each 150 filament skein of hollow fibers was doubled to obtain 300 parallel fibers and, while wet with water, was inserted into a plastic tube fitted with a side tube near each end. The hollow fiber membranes were sealed into the plastic tube with epoxy resin at each end and then were carefully cut outside the end seals to open the hollow fibers for fluid flow. An end fitting and a pressure gauge were attached at one end for measurement of "dead end" pressure and the other end was attached to a buret for measurement of water flow from the open ends of the hollow fibers under reverse osmosis conditions. The resulting units contained hollow fiber membranes with an effective length of 14 inches and a nominal effective area of 0.15 square foot of membrane surface.

The permselective properties of these hollow fiber membranes were determined under reverse osmosis conditions at an applied pressure of 400 pounds per square inch gauge (p.s.i.g.) with an aqueous solution containing 0.5% sodium chloride in a system containing "Monel" metal parts. After about 5 days under these conditions the unit had a flux rate of 2.2 gallons per square foot per day (g.s.f.d.) and a salt passage of 9.3% under conditions such that about 5.0% of the feed solution passed through the unit was passed through the membrane (5.0% conversion). These results correspond to a significant decrease in the original membrane's salt rejecting capability.

After the above 24 hour test period, tannic acid was added to the feed to obtain a solution containing 0.002% (20 parts per million) of tannic acid and 0.5% sodium chloride. After circulating this solution through the unit for 3 hours the feed solution was changed to an aqueous solution containing only 0.5% sodium chloride. After the membrane was exposed to this solution for 24 hours at 400 p.s.i.g., the water flux was 2.0 g.s.f.d. and the salt passage was 0.37% under conditions such that about 4.2% of the feed solution passed through the membrane.

Following the tannic acid treatment, citric acid was added to the feed to give a 1% concentration and this solution was circulated past the membrane for 3 hours. The citric acid solution was then removed and replaced by a 0.5% solution of sodium chloride. The feed of sodium chloride solution was continued for 24 hours, after which the membrane had a flux rate of 2.0 g.s.f.d. and a salt passage of 1.79% at a conversion of 4.1%.

EXAMPLE 2

A polymer was prepared as described in Example 1 using a mixture of 67 parts of metaphenylenediamine and 33 parts of the calcium salt of metaphenylenediamine-4-sulfonic acid. This polymer nominally contained 2.5% sulfur, corresponding to 0.77 sulfonic acid moieties per 1000 grams.

Asymmetric semipermeable membranes were prepared from this polymer by procedures analogous to those of Richter et al. U.S. Pat. No. 3,567,632. Films with a nominal thickness of 0.015 inch were cast with a doctor knife onto smooth plates using a solution containing 15% polymer, 15% lithium nitrate, and 6% lithium chloride in dimethylacetamide. The concentration of lithium salts was based on the weight of the polymer. These films and the supporting plates were heated on a hot plate at 100°C. in a ventilated hood for 5 minutes and were then immersed in water for about 1 hour to obtain permselective membranes, which were kept wet with water until use.

One of these films was exposed to a 0.02 molar copper sulfate solution on the "skin" side and a 0.02 molar sodium hydroxide solution on the "porous" side for a period of 1½ hours. During this time a visible precipitate of hydrous copper oxide formed on the side contacting the copper solution. In a second experiment, this coated film was exposed to a solution containing 50 p.p.m. tannic acid (contacting the coated side) for 2 hours. It was determined that 279 micrograms of tannic acid was absorbed by the coated film during the exposure.

The film was then tested under reverse osmosis conditions along with an untreated control film and a control film merely coated with the hydrous oxide as in the example above.

The tests were conducted in a reverse osmosis device essentially as described by Richter et al. in U.S. Pat. No. 3,567,632. The following table shows the relative performance of the films at 600 p.s.i.g. operating pressure and a 0.5% sodium chloride feed:

| | GFD/% SP | |
|---|---|---|
| | Initial | Final (9 days) |
| Uncoated/untreated control | 18.2/3.5% | 16.4/2.5% |
| Coated control | 19.1/3.1% | 16.1/2.0 |
| Coated — Treated with Tannic Acid | 20.5/2.6% | 19./1.6% |

The embodiments of the invention in which an exclusive property or privilege is claimed are defined as follows:

1. A process for separating solvent from an aqueous solution of inorganic salts, comprising contacting a permselective structure with said solution under a pressure greater than the osmotic pressure of the solution, said permselective structure comprising a non-porous semipermeable membrane selected from cellulosic derivative membranes and nitrogen-linked aromatic polymer membranes and a coating of hydrous heavy metal compositions and said structure having been treated with a solution of a hydrolyzable tannin in an amount and under conditions which result in a significant reduction in salt passage through the structure under reverse osmosis conditions.

2. The process of claim 1 wherein the non-porous semipermeable membrane is a nitrogen linked aromatic polymer of the general formula $+L-R+_n$ wherein each L is independently a linking group and is a

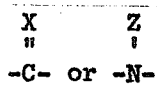

group wherein X is oxygen or sulfur and Z is hydrogen, lower alkyl or phenyl, each R is an organic radical, and $n$ is an integer sufficiently large to provide film forming molecular weight.

3. The process of claim 1 wherein the non-porous semipermeable membrane is a cellulosic derivative of the general formula

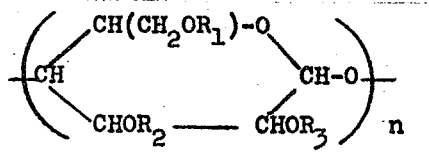

wherein $R_1$, $R_2$ and $R_3$ are hydrogen, alkyl of one to eight carbon atoms or $CR_4O$ wherein $R_4$ is alkyl of one to seven carbon atoms, and $n$ is an integer sufficiently large to provide film forming molecular weight.

4. The process of claim 1 wherein the tannin is tannic acid.

5. The process of claim 4 wherein the tannic acid solution has a pH of about 5 to about 7.

6. The process of claim 1 wherein the permselective structure contains at least about 5 micrograms of hydrolyzable tannin per square centimeter of coating layer.

7. The process of claim 1 wherein the permselective structure contains at least about 10 micrograms of hydrolyzable tannin per square centimeter of coating layer.

8. The process of claim 1 wherein the permselective structure contains at least about 20 micrograms of hydrolyzable tannin per square centimeter of coating layer.

9. The process of claim 1 wherein reduction in salt passage is at least 50%.

* * * * *